Jan. 10, 1967 J. NEUBAUER 3,297,823

SAFETY SCREENS FOR TELEVISION SETS

Filed March 21, 1963

INVENTOR.

Julius Neubauer

BY

Michael J. Striker

Attorney

United States Patent Office 3,297,823
Patented Jan. 10, 1967

3,297,823

SAFETY SCREENS FOR TELEVISION SETS

Julius Neubauer, Hamburg-Lemsahl, Germany, assignor to Heinrich Friedrich Schroeder, Hamburg, Germany
Filed Mar. 21, 1963, Ser. No. 267,046
Claims priority, application Germany, Jan. 31, 1961, N 19,514; July 19, 1962, N 21,870
10 Claims. (Cl. 178—7.82)

This is a continuation-in-part of my application Serial No. 169,185, filed January 24, 1962, now abandoned.

The present invention relates to television receivers in general, and more particularly to an improved safety screen for cathode ray tubes of such appliances. The invention further relates to a method of securing the improved safety screen to the mounting means of the cathode ray tube, to the tube proper, to the mask and/or directly to the housing of a television receiver.

It is well known that implosion of cathode ray tubes of the type used in television receivers may cause considerable damage to property and serious injuries to viewers of the projected image or to persons standing nearby. Therefore, the problem of providing absolutely reliable means of protection is of great concern to the makers of cathode ray tubes and to the manufacturers of television receivers. Attempts were made to prevent ejection and scattering of fragments and splinters of imploded cathode ray tubes by placing a shatterproof laminated glass in front of the tube or by permanently securing shatterproof coatings or films to the exterior viewing or picture faces of the tubes. Shatterproof glass is very heavy and adds considerably (by up to 8 lbs. and even more) to the overall weight of the television receiver. Such glass also adds to the bulkiness of the housing in which the cathode ray tube is installed. Conventional shatterproof layers or films which are applied directly onto the cathode ray tube have met with little commercial success, mainly because their effect is too uncertain and also because they add excessively to the overall cost of the tube. Moreover, and particularly in television receivers equipped with large (23–30 inch) cathode ray tubes, the likelihood that a comparatively thin film of material cemented to the picture face would withstand pressures developing during and immediately following an implosion is very remote so that, even though known for quite some years, such films have failed to gain acceptance by the manufacturers of television receivers. It should be kept in mind that implosion of large picture tubes liberates considerable forces which can cause great material damage and serious injuries.

Accordingly, it is an important object of the present invention to provide a very simple, inexpensive and highly reliable safety screen for cathode ray tubes which is of lightweight construction, which can be readily applied to all types of cathode ray tubes including modern tubes with giant picture faces of 23 inches and upwards, which can be connected to a cathode ray tube without necessitating specially constructed mounting means therefor, which may be attached directly to the housing of a television appliance, and whose cost is but a fraction of the cost involved in the manufacture and mounting of conventional safety screens or shatterproof glasses of which I am aware at this time.

Another object of the present invention is to provide a safety screen for cathode ray tubes which is constructed, assembled and mounted in such a way that, should an implosion occur, it is capable of protecting not only the interior and the occupants of the room in which the television receiver is put to use but also the housing and the remaining parts of the appliance.

A further object of the invention is to provide a safety screen of the above outlined characteristics which does not appreciably affect the quality of the picture when it is applied to the picture face of a cathode ray tube, and which can be applied to the picture face by exclusion of air bubbles and other foreign substances such as could affect the quality of the picture.

An additional object of the invention is to provide a very simple, time-saving and efficient method of securing a safety screen to a cathode ray tube and/or to the housing of a television receiver.

Still another object of the invention is to provide an assembly including a cathode ray tube and a safety screen of the above outlined characteristics which may be rapidly and conveniently mounted in or removed from the housing of a television receiver.

A concomitant object of the invention is to provide a safety screen which will closely hug the picture face of a cathode ray tube even if the face of the tube is not entirely smooth and even if serially produced preformed safety screens are consecutively applied to a series of tubes of the same type but exhibiting slight dimensional differences.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 2:
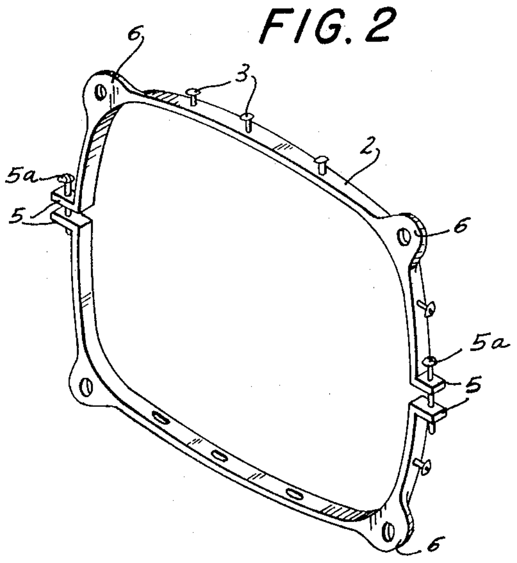
FIG. 2 is a perspective view of the entire mounting means.
Figure 4:
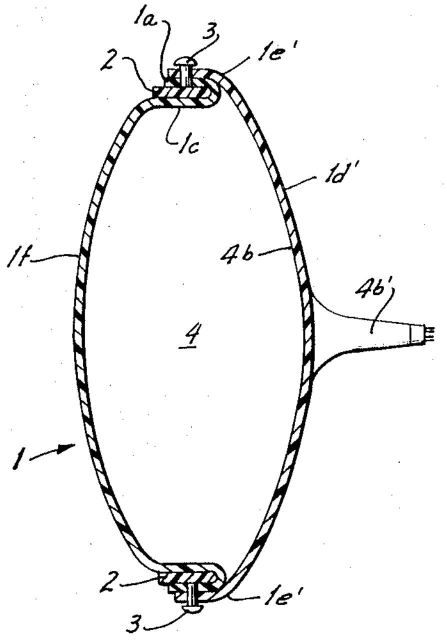
Figure 3:
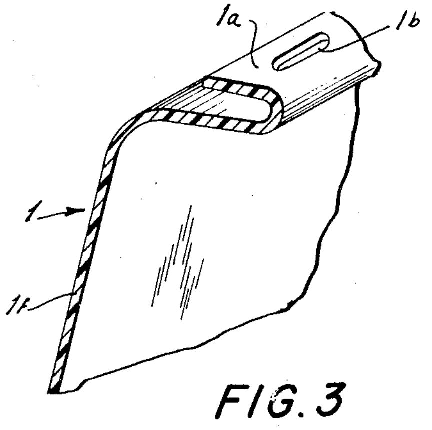

FIG. 3 is a fragmentary perspective view of the safety screen, showing in greater detail the configuration of the marginal portion whose outer section is detachably connectable to retaining pins; and FIG. 4 illustrates the assembly of FIG. 2 and a protective cap which partially surrounds the rear portion of the tube and which is detachably retained on pins or buttons forming part of the mounting means for the tube.

Figure 1:
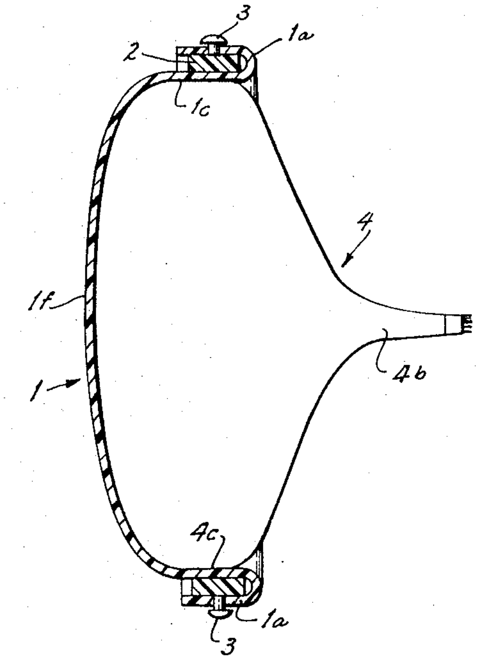
FIG. 1 is a vertical section through an assembly including a cathode ray tube, mounting means therefor, and a safety screen which is clamped by and which is additionally secured to the mounting means in accordance with one embodiment of the invention.

Referring now in greater detail to the illustrated embodiments, and first to FIG. 1, there is shown a highly transparent, flexible and preferably (but not necessarily) at least slightly elastic safety screen 1 of preformed synthetic plastic sheet material which does not scratch and whose front portion **1*f* is applied to the front or picture face 4*f* of a cathode ray tube 4. The screen comprises an endless collar 1*c* which is clamped between the peripheral face 4*c* of the tube 4 and the customary mounting means here shown as comprising flat steel straps or bands 2 having apertured lugs 5 for tensioning bolts 5*a* and attaching devices in the form of apertured brackets or eyes 6** which latter may receive screws or bolts adapted to be driven into the front wall or into the mask of a television receiver.

The mounting means is shown in greater detail in FIG. 2, and it will be noted that each strap 2 comprises a series of outwardly extending retaining buttons or pins 3 having smaller diameter stems and enlarged heads whose purpose will be described hereinafter.

The manner in which an outturned flange **1*a* of the screen 1 is detachably secured to and retained by the mounting means for the tube 4 will be readily understood. The flange 1*a* constitutes a bent-over edge portion of the collar 1*c* and is formed with apertures in the form of elongated slots 1*b* (see also FIG. 3) whose width approximates the diameter of the stems of the pin 3. When the collar 1*c* is being clamped between the straps 2 and the peripheral face 4*c* of the tube 4**, i.e., when the bolts 5a are being drawn tight, the flange 1a is substantially coplanar with the collar 1c. When the bolts 5a are drawn tight, the operator bends or folds the flange 1a onto the straps 2 and causes the heads of the pin 3 to pass through the respective slots 1b to insure that the flange, too, is attached to the mounting means. The brackets or eyes 6 are then secured to the housing of a television receiver in a well-known manner. Suitable cutouts are provided in the flange 1a to accommodate the lugs 5.

It will be noted that the safety screen 1 may be secured to the tube without necessitating the provision of additional parts save for the retaining pins 3 which, however, form part of the mounting means, i.e., of a device which must be used anyway since it secures the tube to the housing of a television receiver. The collar 1c and the flange 1a together constitute a marginal screen portion which is of U-shaped cross section and whose inner annular section 1c is located between the peripheral face 4c and the outer annular section 1a.

Referring again to FIGS. 1, 3 and 4, the screen 1 preferably consists of flexible synthetic plastic material whose thickness need not substantially exceed 1.5 mm. and whose thickness may be less than 1 mm., depending on the strength characteristics of the plastic material and, to certain extent, on the dimensions of the tube. The slots 1b perform the function of buttonholes and cooperate with retaining pins 3 to secure the outer annular section 1a to the mounting means regardless of whether or not the inner annular section 1c is clamped by the straps 2. In addition, the slots 1b permit relative movements between the screen 1 and the straps 2 when the bolts 5a are rotated in a sense to clamp the straps against the annular section 1c.

Extensive tests made with safety screens consisting of polyvinyl chloride (thickness 1 mm.) on 23-inch cathode ray tubes have proven that the screen affords absolutely reliable protection even though the thickness of its material need not substantially exceed and may be even less than 1 mm. From the point of view of cost, performance and weight, the results obtainable with the screen of this invention are far superior to those attainable with conventional screens of which I have knowledge at this time.

It will be readily understood that, in order to increase contrast as well as to avoid unwanted reflections and glare, the screen of the invention may be tinted with grey, gold or other filter shades. Furthermore, reflections may be avoided by using an optically effective safety screen with satinized (knurled, milled, etc.) surfaces. Satinizing renders the outer side of the screen less sensitive to scratches. Also, Newton rings and adhesion effects can be avoided by satinizing the inner side of the screen with an optically effective design. It is equally possible to make the caps of a fine-mesh air-permeable material, such as nylon or "Perlon" (trademark). An important advantage of such fine mesh material is that, should an explosion occur, the interstices permit immediate equalization of pressures at both sides of the screen without, however, permitting ejection of glass splinters such as could cause damage to property or injury to persons observing the picture face. In addition, such textile-like safety screens will be less prone to vibrate when, subsequent to implosion, pressure prevailing in the housing of a television receiver continues to fluctuate for a certain period of time. A rigid glass panel or a non-permeable rigid safety screen is not always capable of withstanding such vibrations.

While it is true that an air-permeable safety screen which assumes the form of a fine-mesh sheet does not exhibit a shiny surface such as is desirable to insure that the safety screen will in no way affect the quality of the picture, textile-like safety screens present a series of important advantages which are not attainable with non-permeable screens. Thus, double reflection and refraction of pictures cannot occur when the safety screen consists of textile-like transparent material.

In assembling the screen with the cathode ray tube, optimal optical effects can be achieved by expelling all traces of air between the picture face of the tube and the inner side or surface of the screen. This may be achieved by coating the picture face with a transparent liquefiable or pasty layer of Vaseline, oil, Canada balsam or a similar substance prior to clamping the marginal portion 1c of the screen. The flexibility and/or elastic deformability of the screen 1 should be sufficient to insure that the screen may assume the outlines of the picture face 4f and of the peripheral face 4c without any wrinkling, folding, pleating or similar undesirable formations which could affect the quality of the picture.

FIG. 4 shows an assembly which is similar to that shown in FIG. 1, excepting that the protective extension 1d' constitutes a separate unit whose marginal portion 1e' is formed with slots or buttonholes secured to the retaining pins 3 so that the marginal portion 1e' overlaps the annular section 1a. This extension 1d serves to partially enclose the rear tube portion 4b.

As stated hereinabove, the material which I prefer to use in the manufacture of my safety screen is a highly flexible, tough sheet of polyvinyl chloride or an equivalent synthetic plastic material. Very good results were obtained with safety screens made of plasticized polyvinyl chloride sheets (Shore hardness 94).

Since most television receivers are fairly heavy and rather bulky, the transportation of such devices is costly and, therefore, reductions in space requirements and weight result in substantial savings to the manufacturer, to the retailer, and to the purchasing public. Since a safety screen of the type described in connection with FIGS. 1 to 4 adds less than a pound to the overall weight of television receivers of the type having 23-inch tubes, savings in weight are unexpectedly high because, and as stated hereinabove, a conventional safety device consisting of glass cemented to the cathode ray tube or of shatterproof laminations placed in front of the picture face may weigh in the neighborhood of 8–10 lbs. or even more. Furthermore, since the screen of my invention closely follows the outlines of the picture face, the depth of the housing is determined solely by dimensions of the picture tube so that the latter may be accommodated in comparatively small housings.

In summation, it can be said that my invention resides in the provision of a flexible safety screen of transparent, preferably elastic, synthetic plastic sheet material which is secured directly to the housing of a television receiver and/or to the mounting means for a cathode ray tube in such a way that the screen remains connected to the housing (either directly or indirectly) at the time the tube is imploded and that the front portion of the screen is neither glued nor bonded to the picture face whereby fragments of an imploded tube will not adhere thereto. The marginal portion of the screen is secured to the front or side wall of the housing, to the mask or to the mounting means (which is secured to the housing) so that it covers and seals the front opening and that, while the screen may yield to the pressure of air when an implosion occurs, it remains connected with the housing and prevents ejection of fragments through the front opening.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a television receiver, in combination, a cathode ray tube having a picture face and a peripheral face adjacent to such picture face; an independent transparent safety screen of flexible synthetic plastic sheet material, said independent transparent safety screen of flexible plastic sheet material being superimposed upon and following closely the outlines of said picture face without being attached thereto and having a section surrounding said peripheral face; and mounting means surrounding and engaging said peripheral face of said tube whereby to clampingly press said section of said independent transparent safety screen against said peripheral face and firmly mount said screen on said tube.

2. A television receiver as set forth in claim 1, wherein said screen of sheet material consists of air-permeable material.

3. A television receiver as set forth in claim 1, wherein said screen has an inner and an outer surface, at least one of which is satinized, and wherein said sheet material has a thickness of between 0.5 and 1.5 mm.

4. In a television receiver, in combination, a cathode ray tube having a convex picture face and a peripheral face adjacent to said picture face; an independent transparent safety screen of flexible synthetic plastic sheet material, said independent transparent safety screen of flexible plastic sheet material being superimposed upon and having a front portion following closely the outlines of said picture face without being attached thereto and a section surrounding said peripheral face; and mounting means comprising tensioned strap means surrounding and engaging said peripheral face of said tube whereby to clampingly press said section of said independent transparent safety screen against said peripheral face and firmy mount said screen on said tube, said safety screen, said tube and said mounting means forming a unit and said mounting means comprising attaching devices by means of which said unit is detachably secured to the housing of the receiver.

5. In a television receiver, in combination, a cathode ray tube having a picture face and a peripheral face adjacent to such picture face; an independent transparent safety screen of flexible synthetic plastic sheet material, said independent transparent safety screen of flexible plastic sheet material being superimposed upon and following closely the outlines of and abutting against said picture face by exclusion of air bubbles without being attached to said picture face, and having a section surrounding said peripheral face; and mounting means surrounding and engaging said peripheral face of said tube whereby to clampingly press said section of said independent transparent safety screen against said peripheral face and firmly mount said screen on said tube.

6. In a television receiver, in combination, a cathode ray tube having a picture face and a peripheral face adjacent to said picture face; a flexible safety screen of transparent synthetic plastic sheet material, said screen comprising a front portion adjacent to and closely following the outlines of said picture face and a marginal portion of U-shaped cross-section, said marginal portion comprising an inner annular section surrounding said peripheral face and an outer annular section integral with said inner annular section; and mounting means comprising tensioned strap means interposed between said sections and clampingly pressing said inner section against said peripheral face, and retaining mean securing said outer annular section to said strap means.

7. A combination as set forth in claim 6, wherein said retaining means comprises a plurality of headed pins extending outwardly from and rigid with said strap means, said outer annular section having slot means through which said pin extend.

8. A combination as set forth in claim 6, wherein said annular sections have integral edge portions distant from said picture face and wherein said mounting means further comprises attaching means including apertured eyes outwardly adjacent to said picture face and rigid with said strap means.

9. In a television receiver, in combination, a cathode ray tube having a picture face, a peripheral face adjacent to said picture face, a rear portion whose dimensions diminish in a direction away from said picture face; a flexible safety screen of transparent synthetic plastic sheet material, said screen comprising a front portion adjacent to and closely following the outlines of said picture face and a marginal portion of U-shaped cross-section, said marginal portion comprising an inner annular section surrounding said peripheral face, an outer annular section integral with said inner annular section, and an extension at least partially surrounding the rear portion of said tube and having a marginal portion surrounding said outer annular section; and mounting means comprising tensioned strap means interposed between said sections and clampingly pressing said inner section against said peripheral face, and retaining means securing said outer annular section and the marginal portion of said extension to said strap means.

10. A combination as set forth in claim 9, wherein said outer annular section and the marginal portion of said extension are provided with registering slots and wherein said retaining means comprises a plurality of pins extending outwardly from said strap means and passing through such registering slots.

References Cited by the Examiner

UNITED STATES PATENTS

| | | | |
|---|---|---|---|
| 2,293,529 | 8/1942 | Bedford | 178—7.82 |
| 2,670,501 | 3/1954 | Michiels | 264—90 |
| 2,832,094 | 4/1958 | Groth | 18—19 |
| 3,011,212 | 12/1961 | Marshall et al. | 264—90 |
| 3,051,782 | 8/1962 | Giacchetti et al. | 178—7.82 |
| 3,072,964 | 1/1963 | Tilden | 18—19 |
| 3,129,285 | 4/1964 | Miller | 178—7.82 |
| 3,130,854 | 4/1964 | Casciari | 178—7.82 |
| 3,139,485 | 6/1964 | Gray et al. | 178—7.8 |
| 3,146,305 | 8/1964 | Monaco et al. | 178—7.82 |

OTHER REFERENCES

"Ideas for Design-Acrylic Implosion Shields," pp. 118–119, Electronic Design, February 15, 1957.

DAVID G. REDINBAUGH, *Primary Examiner.*

R. L. RICHARDSON, *Assistant Examiner.*